US009333641B2

(12) United States Patent
Macias et al.

(10) Patent No.: US 9,333,641 B2
(45) Date of Patent: May 10, 2016

(54) MAGNETIC BANDS

(71) Applicants: Miguel Angel Macias, Anaheim, CA (US); Marco Galli, Yorba Linda, CA (US)

(72) Inventors: Miguel Angel Macias, Anaheim, CA (US); Marco Galli, Yorba Linda, CA (US)

( * ) Notice: Subject to any disclaimer, the term of this patent is extended or adjusted under 35 U.S.C. 154(b) by 0 days.

(21) Appl. No.: 14/187,050

(22) Filed: Feb. 21, 2014

(65) Prior Publication Data

US 2014/0259552 A1 Sep. 18, 2014

Related U.S. Application Data

(60) Provisional application No. 61/789,988, filed on Mar. 15, 2013.

(51) Int. Cl.
*B25J 3/00* (2006.01)
*B25H 3/00* (2006.01)

(52) U.S. Cl.
CPC .. *B25H 3/00* (2013.01); *Y10T 24/32* (2015.01)

(58) Field of Classification Search
CPC ................. A45F 2200/0575; A47G 2200/106; B25H 3/00; B25H 3/003; H01F 7/0263; B25B 23/00
USPC .................................................. 248/683, 537
See application file for complete search history.

(56) References Cited

U.S. PATENT DOCUMENTS

| | | | | |
|---|---|---|---|---|
| 2,385,859 | A * | 10/1945 | Jacobson | 335/285 |
| 2,448,611 | A * | 9/1948 | Martin | 116/234 |
| 2,594,955 | A * | 4/1952 | Markowitz | 248/683 |
| 3,921,620 | A * | 11/1975 | Nakayama | 600/15 |
| 5,130,899 | A * | 7/1992 | Larkin et al. | 362/570 |
| 5,593,073 | A * | 1/1997 | Finnegan | A44C 5/0007 224/183 |
| 5,682,653 | A * | 11/1997 | Berglof et al. | 24/303 |
| 5,782,743 | A * | 7/1998 | Russell | 600/9 |
| 6,193,202 | B1 * | 2/2001 | Rogers | 248/311.2 |
| 6,496,094 | B2 * | 12/2002 | May, III | B25B 11/002 211/69 |
| 6,910,578 | B2 * | 6/2005 | Stern | 206/379 |
| 7,096,544 | B2 * | 8/2006 | Lusardi | 24/306 |
| 7,817,002 | B2 * | 10/2010 | Fullerton et al. | 335/306 |
| 8,235,262 | B1 * | 8/2012 | Sakdol | 224/183 |
| 8,261,416 | B2 * | 9/2012 | Rothbaum et al. | 24/17 R |
| 8,505,420 | B2 * | 8/2013 | Alfaro | 81/489 |
| 2003/0052143 | A1 * | 3/2003 | Devine | 224/183 |
| 2004/0094686 | A1 * | 5/2004 | Hsien | 248/537 |
| 2004/0104320 | A1 * | 6/2004 | Exler | 248/206.5 |
| 2004/0245415 | A1 * | 12/2004 | Sun | A47G 23/0225 248/206.5 |
| 2006/0016841 | A1 * | 1/2006 | Shurm | A45F 5/00 224/222 |
| 2010/0025442 | A1 * | 2/2010 | Shurm | A45F 5/00 224/183 |
| 2012/0125046 | A1 * | 5/2012 | Vander Wal | A44C 15/003 63/1.18 |
| 2014/0299640 | A1 * | 10/2014 | Escherich | B25H 3/003 224/183 |

* cited by examiner

*Primary Examiner* — Bradley Duckworth
(74) *Attorney, Agent, or Firm* — Rutan & Tucker, LLP; William W. Schaal

(57) ABSTRACT

An elastic band comprising a depository area is disclosed. The band may be closed or open-ended. The depository area may hold a magnet. A magnet-retaining band attached to a handle portion of a tool can secure magnetically and removably the tool to a ferrous object.

18 Claims, 6 Drawing Sheets

MAGNETIC BANDS

CROSS-REFERENCE TO RELATED APPLICATIONS

This application claims the benefit of priority on U.S. Provisional Application No. 61/789,988 filed Mar. 15, 2013, the contents of which are incorporated by reference.

FIELD

Embodiments of the present invention relate generally to means for holding an article, and particularly to structures wherein the article is secured to a bracket by ferrous attraction.

BACKGROUND

Tools in general are configured primarily for their use, with little or no consideration being given to their storage when not in use. Hand tools are often tossed into a tool chest drawer or the like for storage, where they are subject to sliding around and being mixed with other tools each time the drawer is opened or closed and/or the chest is moved. One solution of this problem has been the placement of a padded sheet of material in the bottom of the tool chest drawer, but such relatively soft padded material is often subject to deterioration due to the impact of tools as they are replaced in the drawer, and such material does nothing to retain the tool(s) positively in a specific position in the drawer.

U.S. Patent Publication 2011/0308980 discloses hand tools with magnets installed under a sleeve of resilient material disposed over each handle. These hand tools can be secured magnetically and removably to a ferrous metal panel for storage or to a ferromagnetic work piece. But end users of tools are unlikely to have the equipment or expertise to be able to install magnets on conventional tools they already own in the way disclosed by the aforementioned patent publication. Thus, an invention that end users can conveniently apply to tools they already own to enhance those tools with the same advantageous features described above is desired.

SUMMARY

In one embodiment, one closed band is made of an elastic material and includes at least one depository area. Once at least one magnet is deposited in the at least one depository area, and one or more such magnet-retaining bands are attached to at least one handle portion of a hand tool, the hand tool is capable of being secured magnetically and removably to a ferrous metal panel for storage or to a ferromagnetic work piece.

In another embodiment, one open-ended band with a fastening mechanism installed on one or both ends is made of an elastic material and includes at least one depository area. Once at least one magnet is deposited in the at least one depository area, and one or more such open-ended magnet-retaining bands are attached to at least one handle portion of a hand tool with the fastening mechanism, the hand tool is capable of being secured magnetically and removably to a ferrous metal panel for storage or to a ferromagnetic work piece.

Disclosed is an elastic band comprising a depository area further comprising a slit opening for insertion and removal of at least one magnet, wherein the at least one magnet, when inserted and deposited into the depository area, occupies at least seventy percent of the volume of the depository area.

Disclosed is a method for securing magnetically and removably a tool to a ferrous object, comprising attaching to at least one handle portion of the tool at least one elastic band containing at least one depository area, wherein the at least one depository area holds at least one magnet; and placing the handle portion of the tool close to the ferrous object so that the at least one magnet is secured magnetically and removably to the ferrous object by way of ferrous attraction.

Disclosed is an apparatus for securing magnetically and removably a tool to a ferrous object, comprising means for elastically attaching the apparatus to a handle portion of the tool; and means for securing magnetically and removably the apparatus to the ferrous object by way of ferrous attraction.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention by way of example and not limitation. In the drawings, in which like reference numerals indicate similar elements.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
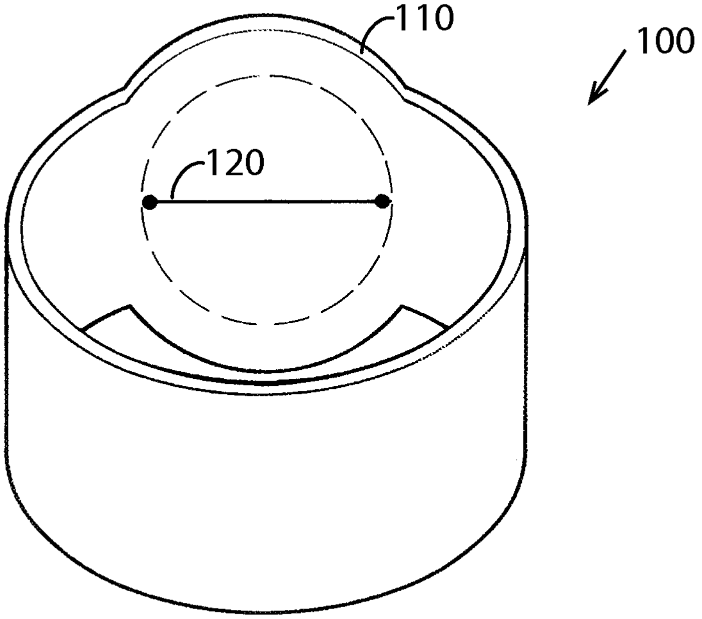
FIG. 1 is a perspective view of an exemplary embodiment of a closed band made of an elastic material and having one depository area with a slit.

FIG. 1 is a perspective view of a closed band 100 made of an elastic material and having one depository area 110 with a slit 120. The closed band 100 is a one-piece component with both ends of the band 100 integrally coupled to opposite sides of the depository area 110.

Figure 2:
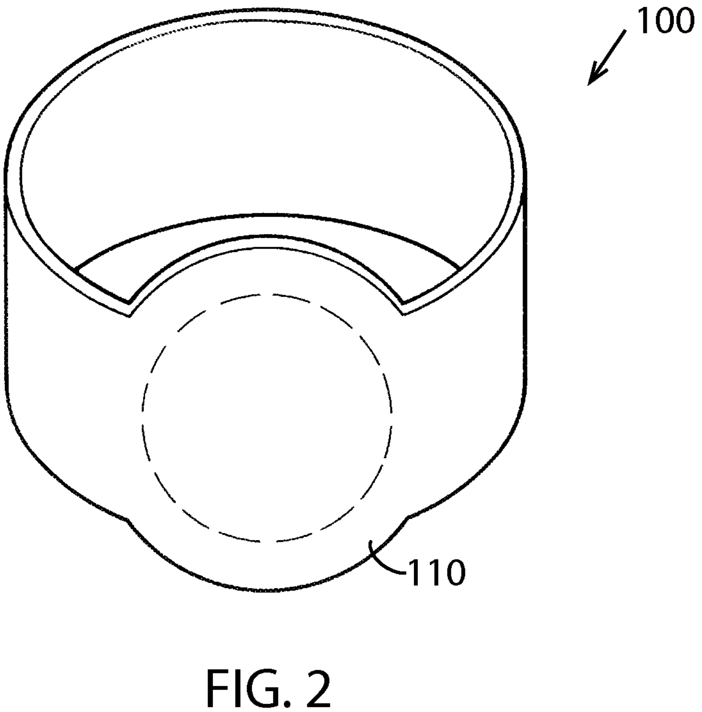
FIG. 2 is another perspective view of the closed band of FIG. 1.

FIG. 2 is another perspective view of the same closed band. The band 100 may be made with any kind of elastic material, and in one embodiment silicone is used. The depository area 110 may be a pouch or a closed hollow space which may hold a magnet. In one embodiment, the depository area 110 may be a pouch with a slit 120 on the broad side of the closed band 100 facing inward. A user may insert and deposit a magnet into the pouch through the slit. In one embodiment, the magnet inserted and deposited into the depository area occupies at least seventy percent of the volume of the depository area. But the invention is not so limited. Alternatively, the depository area 110 may be a closed hollow space in which a magnet is embedded at the time of manufacture of the band. Any type of permanent magnets may be used, and in one embodiment Neodymium magnets are used for their strong pull force. Although the depository areas 110 in FIG. 1 and FIG. 2 are in a perceptibly round shape and are wider than the rest of the closed band, the invention is not so limited. The depository area can be in any shape, and can be narrower than, equal in width to, or wider than the rest of the closed band.

The band is amenable to customization. The color and the surface texture are customizable at the time of manufacture. The band can be made in a desirable color or combination of colors with desirable surface textures. Moreover, the band can be embossed, debossed, or printed on to include images, logos, or texts at the time of manufacture.

It should be appreciated that the band may have more than one depository area, and in the case of more than one depository area, although at least one depository area should hold at least one magnet, some of the other depository areas may hold components other than a magnet.

Figure 3:
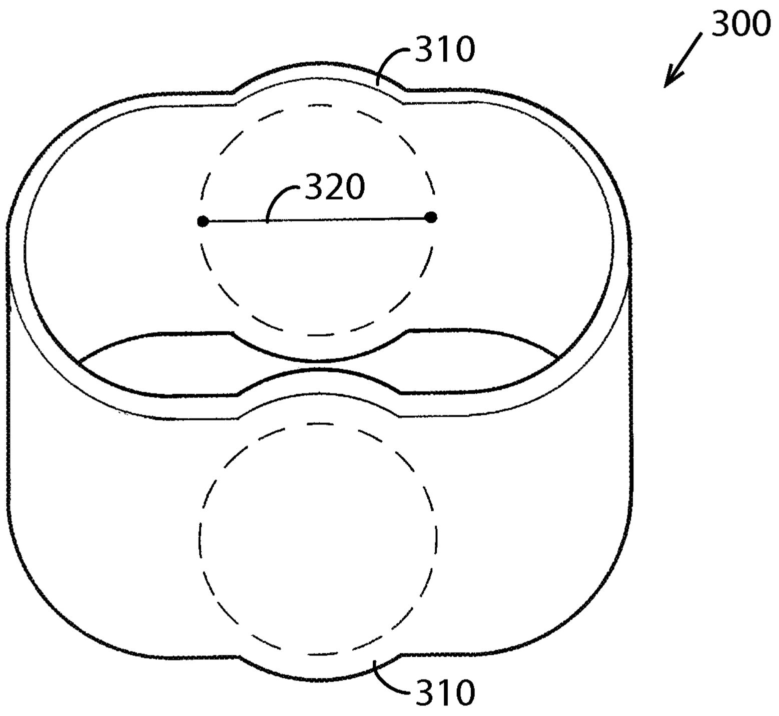
FIG. 3 is a perspective view of an exemplary embodiment of a closed band made of an elastic material and having two depository areas each with a slit.

For example, FIG. 3 is a perspective view of a closed band 300 having two depository areas 310 each with a slit 320. In one embodiment, both depository areas 310 may each hold a magnet.

Figure 4:
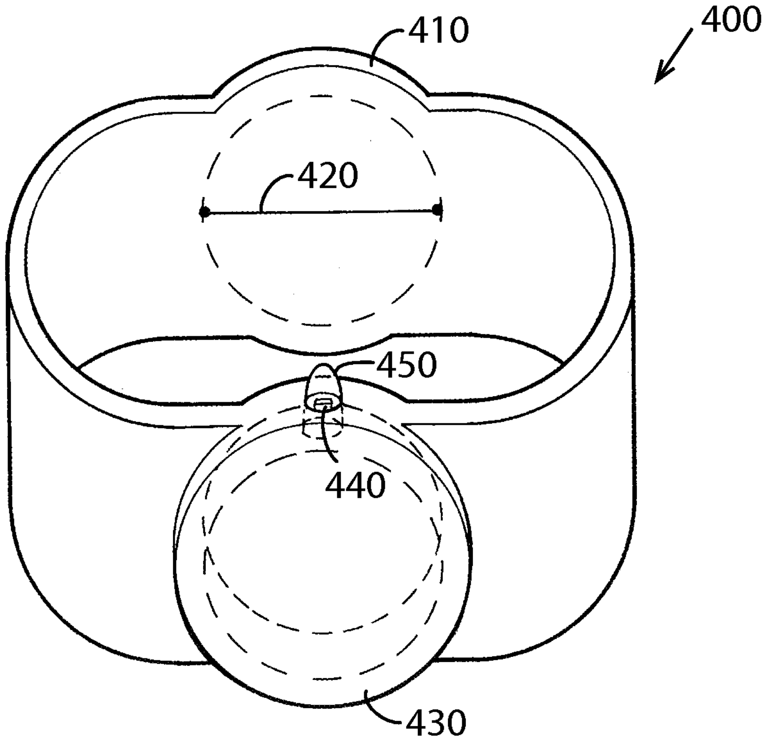
FIG. 4 is a perspective view of another exemplary embodiment of a closed band made of an elastic material and having two depository areas, wherein one depository area has an aperture on the narrow side and holds an illumination component, and the other depository area has a slit.

On the other hand, FIG. 4 is a perspective view of a closed band 400 having two depository areas 410 and 430, wherein one depository area 430 has an aperture 440 on the narrow side and holds an illumination component 450, and the other depository area 410 has a slit 420. In this embodiment, an illumination component 450, such as a LED, coupled with a requisite power source and circuitry, may be deposited in the depository area 430 with the aperture 440, such that light emitted by the illumination component 450 can pass through the aperture 440 when the illumination component 450 is activated. Thus the embodiment illustrated by FIG. 4 can also be used as a flashlight. It should be appreciated that although in this embodiment the aperture 450 is located on a narrow side of a depository area 430, the invention is not so limited.

The closed band described herein can be stretched to snugly fit a handle portion of a ferrous or non-ferrous tool. Suitable tools include slip-joint pliers, screwdrivers, Channellock® pliers, adjustable wrenches, sockets, and so on. Suitable tools may also include sporting goods with handle portions, such as tennis and racquetball racquets, baseball bats, golf clubs, hockey sticks, and so on. Bands of different sizes/diameters may be manufactured and provided to accommodate tools of different sizes. A tool fitted with the band may be secured magnetically and removably to a ferrous metal panel for storage or to a ferromagnetic work piece. Depending on the weight of the tool, more than one band may be needed for one tool.

Figure 5:
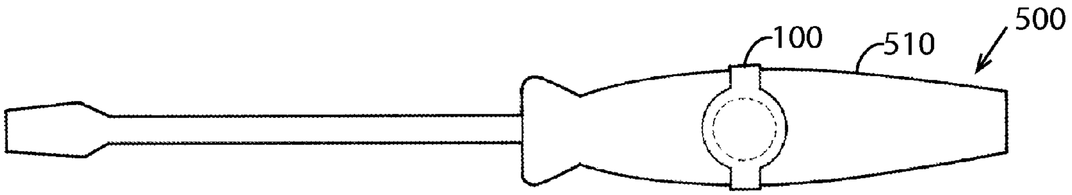
FIG. 5 is an illustration of a screwdriver with a closed magnetic band attached to its handle portion.
Figure 6:
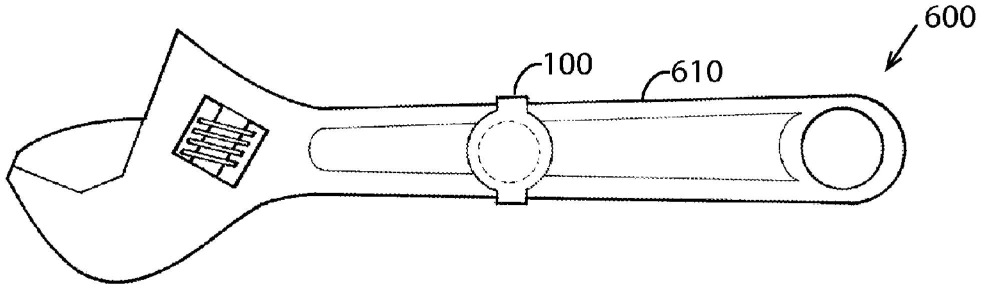
FIG. 6 is an illustration of an adjustable wrench with a closed magnetic band attached to its handle portion.
Figure 7:
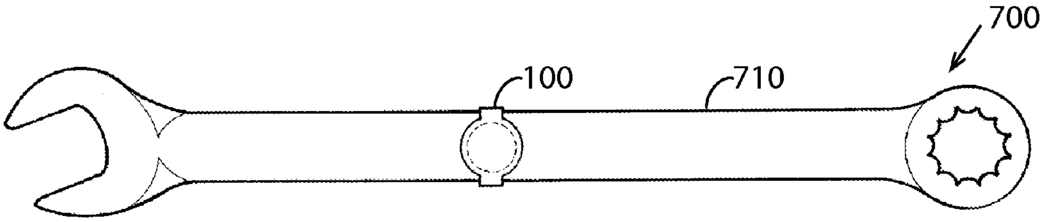
FIG. 7 is an illustration of a combination wrench with a closed magnetic band attached to its handle portion.
Figure 8:
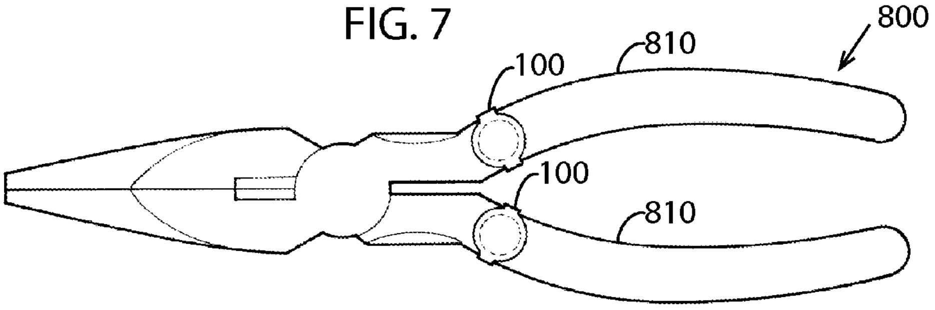
FIG. 8 is an illustration of a pair of combination pliers with one closed magnetic band attached to each of its two handle portions.

FIGS. 5-8 are illustrations of sample tools fitted with the closed magnetic band 100 described herein. FIG. 5 is an illustration of a screwdriver 500 with a closed magnetic band 100 attached to its handle portion 510. FIG. 6 is an illustration of an adjustable wrench 600 with a closed magnetic band 100 attached to its handle portion 610. FIG. 7 is an illustration of a combination wrench 700 with a closed magnetic band 100 attached to its handle portion 710. FIG. 8 is an illustration of a pair of combination pliers 800 with one closed magnetic band 100 attached to each of its two handle portions 810.

Some handle or handle-like portions may benefit from a magnet attached thereto, but are not open-ended, preventing the use of a closed magnetic band described above. Examples of such handle or handle-like portions include, but are not limited to, hand-saw handles, tool bag handles, ice cooler handles, tool kit/box handles, vehicle roll-bars, bed racks of pick-up trucks, etc. Therefore open-ended bands with at least one depository area are envisioned and disclosed below.

Figure 9:
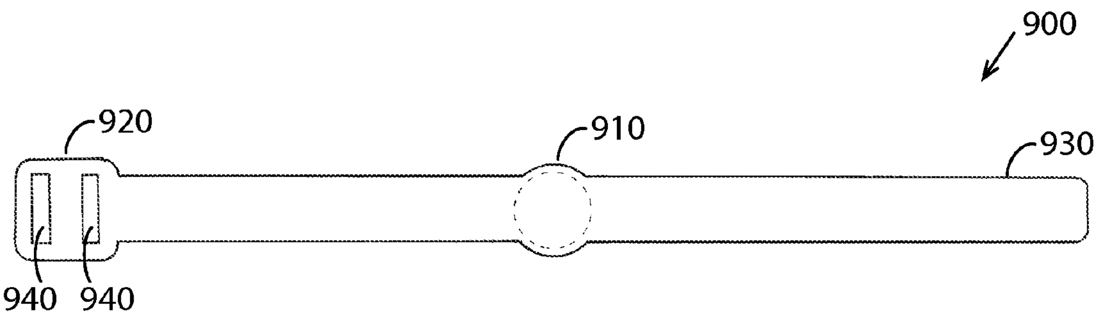
FIG. 9 is an illustration of an exemplary embodiment of an open-ended band made of an elastic material and having two slotted openings on one end and one depository area.
Figure 10:
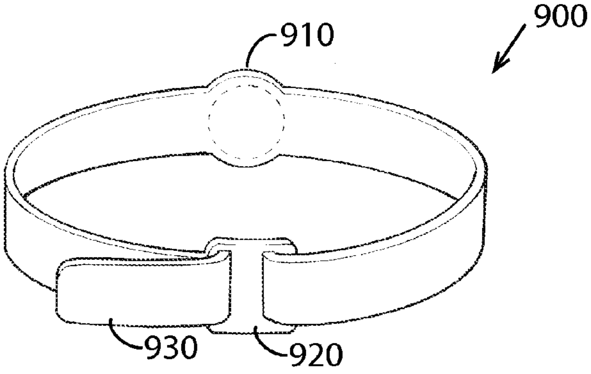
FIG. 10 is a perspective view of the open-ended band of FIG. 9 with its ends joined.

FIG. 9 is an illustration of an open-ended band 900 made of an elastic material and having two slotted openings 940 on one end 920 and one depository area 910. FIG. 10 is an illustration of the same open-ended band 900 with its ends 920 and 930 joined through the slotted openings 940. It should be appreciated that while this example open-ended band 900 discloses an embodiment having an end 920 with two slotted openings 940 capable of receiving the other end 930 of the band 900, the invention is not so limited. Any other fastening mechanism applicable to open-ended elastic bands may also be utilized. It should also be appreciated that although only one depository area 910 is shown, the invention is not so limited. It should also be appreciated that although the depository area 910 is illustrated with a specific shape and size relative to the rest of the band, the invention is not so limited. In one embodiment, the depository area 910 is placed closer to the slotted end 920 so that an extra length of the male end 930 can be pulled through the slots 940 to tighten the band 900. In another embodiment, the slotted end 920 may have a rib-like texture on it to prevent the male end 930 from slipping and thus loosening the applied band 900.

Tools fitted with the magnetic band described herein may be placed in a variety of ways that allow for handy access and easy storage. For example, such tools can be attached to the ferrous panels of an automobile or its undercarriage for handy, in sight, access for the mechanic while s/he is working on a vehicle. The mechanic may also be able to attach the tools to a rolling Mechanics Creeper if it has a ferrous frame. There would be no need to feel around the garage floor or the ground for a tool while the mechanic is under a vehicle.

Tools fitted with the magnetic band described herein can be stored neatly and orderly in the drawers of a mechanic's ferrous rolling tool chest. There is no need for a rubber pad at the bottom of the drawer to prevent the tools from sliding. The tools inside will not slide and mix when the drawer is opened or closed or if the chest is jostled or up-ended.

Kitchen utensils, such as spatulas, spoons, tongs, ladles, whisks, flippers, etc., fitted with the magnetic band described herein can be attached to a stove's ferrous range hold or attached to a ferrous utensil holding stand that is within easy reach. They can also be attached to the ferrous panel of a refrigerator, a ferrous pot or skillet rack, a ferrous wall-mounted plate/strip, or a ferrous utensil holding rack for storage.

Lawn tools, such as rakes, shovels, pole saws, hoes, etc., fitted with the magnetic band described herein can be attached to the ferrous floor or side paneling of the bed of a pick-up truck. The tools can also be attached to a ferrous bed rack or roll bar of a truck. The lawn tools can also be attached to a ferrous rack in a shed, or to the walls of a ferrous shed.

Figure 11:
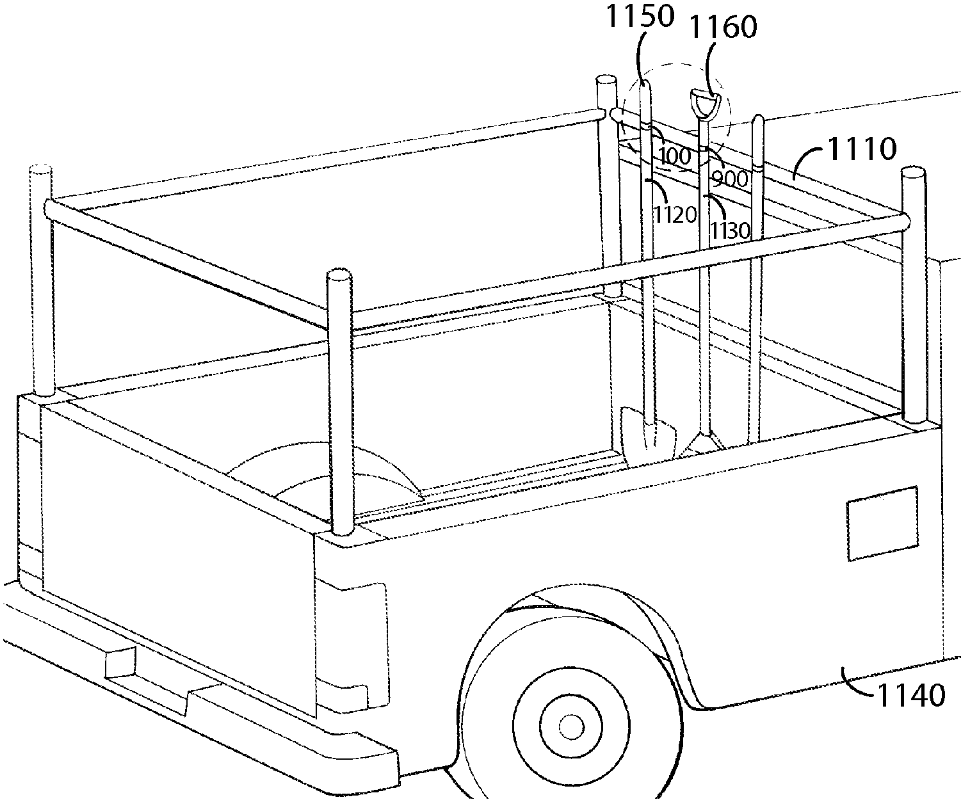
FIG. 11 is a perspective view of two hand tools secured magnetically to the bed rack of a truck at their respective handle portions, wherein one handle portion is fitted with a closed magnetic band, and the other an open-ended magnetic band.
Figure 12:
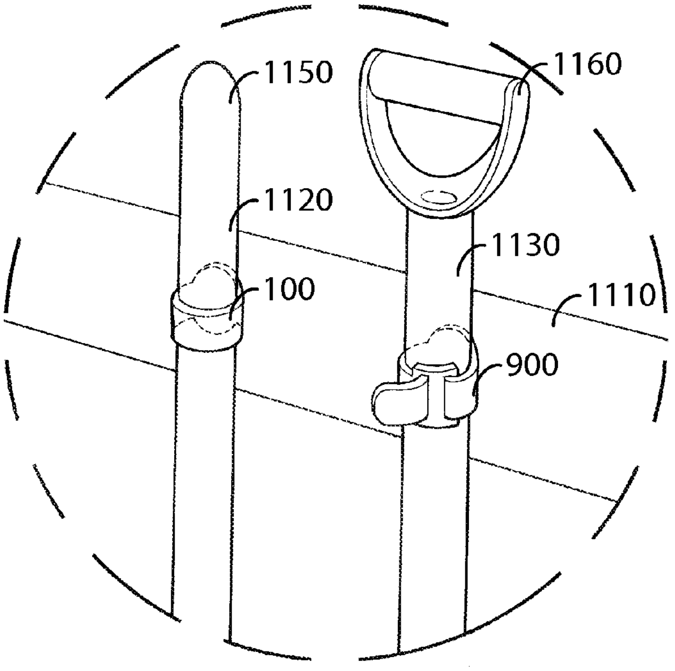
FIG. 12 is a close up perspective view of handle portions and the bed rack of FIG. 11 where the closed magnetic band and the open-ended magnetic band are attached and the handle portions are secured.

For example, FIG. 11 is a perspective view of two hand tools 1150 and 1160 secured magnetically to the bed rack 1110 of a truck 1140 at their respective handle portions 1120 and 1130, wherein one handle portion 1120 is fitted with a closed magnetic band 100, and the other 1130 an open-ended magnetic band 900. FIG. 12 is a close up perspective view of handle portions 1120 and 1130 and the bed rack 1110 of FIG. 11 where the closed magnetic band 100 and the open-ended magnetic band 900 are attached and the handle portions 1120 and 1130 are secured to the bed rack 1110.

Fishing rods fitted with the magnetic band described herein can be attached to a ferrous paneling of a pick-up truck bed, roll bar, or rack. Firearms fitted with the magnetic band described herein can be attached to the ferrous inside walls of gun safes.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. An apparatus comprising:
an elastic band having a first width;
at least one magnet;
a first depository area integrally coupled between a first end of the elastic band and a second end of the elastic band, the first depository area having a second width exceeding the first width for storage of the at least one magnet, deposited into the first depository area, that occupies at least seventy percent of a volume of the first depository area; and
a second depository area integrally coupled with the elastic band, the second depository area comprises a depth for receipt and storage of an illumination component and an aperture through which the illumination component partially extends, the illumination component to emit light while positioned at least partially within the second depository area.

2. The apparatus of claim 1, wherein the elastic band is a continuous band integrally coupled to opposite sides of the first depository area.

3. The apparatus of claim 1, wherein the elastic band is open-ended, and further comprising a fastening mechanism on at least one end of the elastic band.

4. The apparatus of claim 1, wherein the second depository area is positioned at a location along the elastic band opposite to and facing the first depository area.

5. The apparatus of claim 1, wherein the at least one magnet is a Neodymium magnet.

6. The apparatus of claim 1, wherein the elastic band is made of silicone.

7. The apparatus of claim 1, wherein the second depository area comprises the illumination component at least partially embedded within the second depository area, the illumination component includes a light-emitting diode (LED) protruding from the aperture and a power source.

8. An apparatus comprising:
an elastic band;
at least one magnet;
a first depository area integrally coupled with the elastic band, the first depository area for storage of the at least one magnet that occupies at least seventy percent of a volume of the first depository area; and
a second depository area integrally coupled with the elastic band, the second depository area comprises a depth for receipt and storage of an illumination component and an aperture through which the illumination component partially extends, the illumination component to emit light while positioned at least partially within the second depository area.

9. The apparatus of claim 8, wherein the elastic band includes a continuous band integrally coupled to opposite sides of the first depository area and the second depository area.

10. The apparatus of claim 8, wherein the elastic band is open-ended, and further comprising a fastening mechanism on at least one end of the elastic band.

11. The apparatus of claim 8, wherein the second depository area is positioned at a location along the elastic band opposite to and facing the first depository area.

12. The apparatus of claim 8, wherein the at least one magnet is a Neodymium magnet.

13. The apparatus of claim 8, wherein the elastic band is made of silicone.

14. The apparatus of claim 8, wherein the first depository area and the second depository area are integrally formed as part of the elastic band, where the first depository area having a first width greater than a width of the elastic band and the second depository area having a second width greater than the width of the elastic band.

15. The apparatus of claim 8, wherein the illumination component residing with the second depository comprises a light-emitting diode (LED) protruding from the aperture and outside the second depository area and a power source.

16. An apparatus comprising:
a continuous elastic band;
at least one magnet;
a first depository area integrally coupled with the elastic band, the first depository area for storage of the at least one magnet; and
a second depository area integrally coupled with the elastic band, the second depository area includes a depth for receipt and storage of an illumination component that includes a light-emitting diode and a power source and an aperture through which the light-emitting diode extends, the illumination component to emit light while at least partially residing within the second depository area.

17. The apparatus of claim 16, wherein the first depository area is positioned along the elastic band opposite to and facing the second depository area.

18. The apparatus of claim 16, wherein the first depository area and the second depository area are integrally formed as part of the elastic band, where the first depository area having a first width greater than a width of the elastic band and the second depository area having a second width greater than the width of the elastic band.

* * * * *